United States Patent Office 2,843,470
Patented July 15, 1958

2,843,470
PROCESS AND PRODUCT

Norman E. Searle, Wilmington, Del., assignor to E. I. du Pont de Nemours and Company, Wilmington, Del., a corporation of Delaware No Drawing. Application February 8, 1957
Serial No. 638,931

3 Claims. (Cl. 71—2.3)

This invention relates to certain polysubstituted benzoic anhydrides and to herbicidal compositions and methods employing these compounds.

The compounds of this invention are characterized by the following structural formula:

(1)
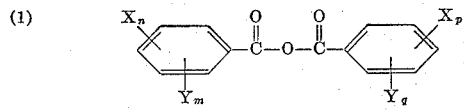

wherein X is halogen, preferably chlorine; Y is methyl; $n$ and $p$ are whole numbers from 2–4, that is 2, 3 or 4; $m$ and $q$ are numbers from 0–2, that is 0, 1 or 2; with the proviso that $n+m$ is equal to 3 or 4 and $p+q$ is equal to 3 or 4.

These compounds have been found to possess outstanding herbicidal activity both in foliar and soil applications. They are characterized by decreased volatility hazard, as compared to the corresponding acids. They are well suited for use as soil sterilants, persisting in soil for long periods of time to give prolonged herbicidal activity. Furthermore, they are effective against deep rooted weeds since they tend to migrate readily downward in the soil, not being adsorbed excessively by the surface soil. Still another feature of these compounds is the ease with which they can be formulated into oil compositions.

The tri- and tetra-substituted benzoic anhydrides of this invention can be prepared by a number of conventional routes. For example, they can be prepared by the acylation of carboxylic acids by acyl halides in accordance with the following representative equation:

(2)
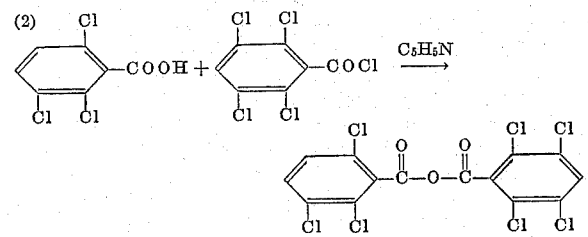

The reaction proceeds with the intermediate formation of a pyridinium salt of the acyl halide and pyridine, which is a powerful acylating agent.

In the absence of a carboxylic acid the pyridinium salt will diacylate in water at low temperatures, to give symmetrical anhydrides, thus:

(3)
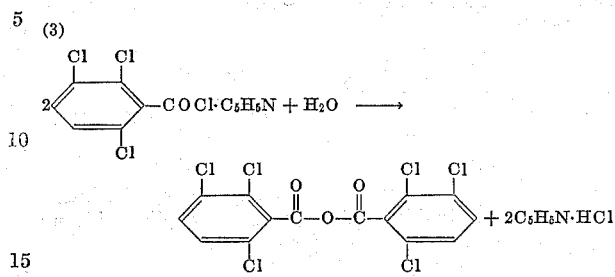

The reaction of Equation 2 is thus suitable for the preparation of both mixed and symmetrical substituted benzoic anhydrides, whereas the reaction of Equation 3 is suitable only for symmetrical anhydrides.

Alternatively, these anhydrides can be prepared by the dehydration of carboxylic acids in accordance with the following representative equation:

(4)
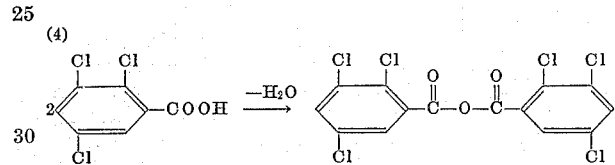

Dehydration is generally accomplished by heating the acid with acetyl chloride, phosphorus oxychloride or preferably acetic anhydride, as in the following equations:

(5)
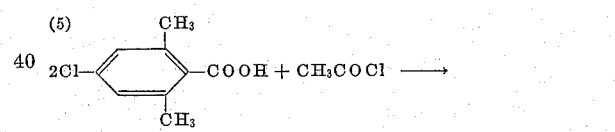

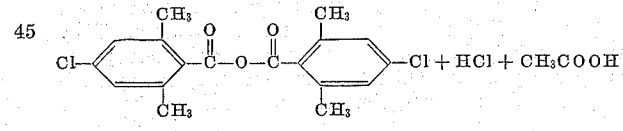

(6)
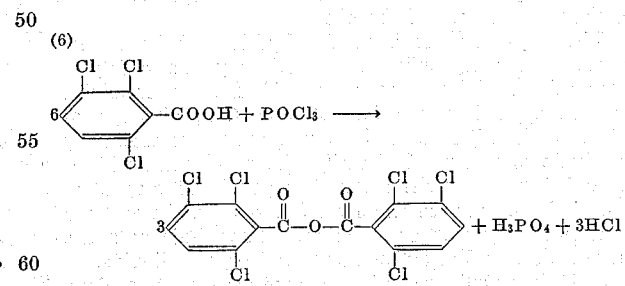

(7)

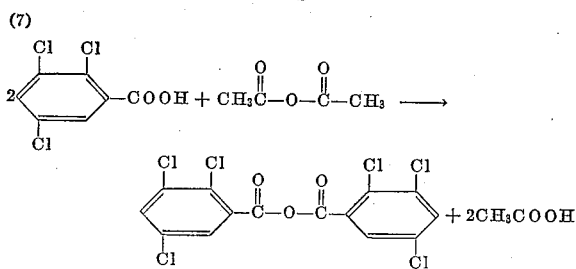

Still another method of preparing these compounds is by the interaction of acyl halides and anhydrides, in accordance with the following representative equation:

(8)

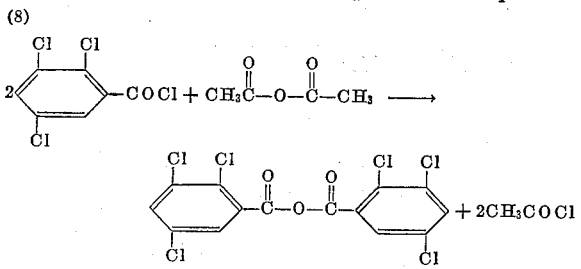

Also, these compounds can be prepared by the interaction of acyl halides and salts of carboxylic acids in accordance with the following equation:

(9)

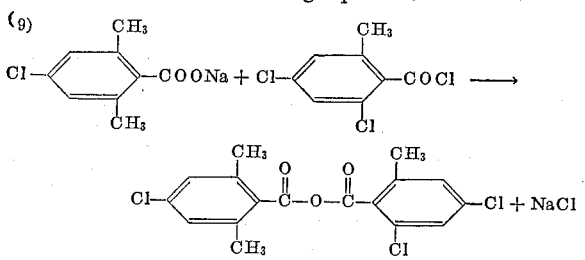

Mixed anhydrides are obtainable in varying proportions with all of these methods if the acids or derivatives of the acids used in the reaction are themselves mixtures. Thus, mixtures of tri- and/or tetra-substituted isomers, such as would be obtained from reaction mixtures in the preparation of the acids without separation of pure components, would tend to give mixtures of symmetrical anhydrides as well as mixed anhydrides.

The substituted benzoyl halides employed in Reactions 1, 2, 8 and 9 are shown as chlorides; however, corresponding benzoyl bromides and iodides can be utilized, and in some cases benzoyl fluorides. However, the use of bromides, iodides or fluorides would not seem justified since these derivatives are generally more expensive and the chlorides are sufficiently reactive in most instances. Similarly, the acid chlorides used as dehydrating agents in Reactions 5 and 6 could be replaced by other halide analogs.

The compounds of this invention are solids which are not readily distilled even under reduced pressure. They are essentially insoluble in water and only slowly hydrolyzed by water. On the other hand, they are appreciably soluble in non-polar solvents such as benzene, toluene, xylene, chloro hydrocarbons, alkylated naphthalene, kerosene, and the like.

The polysubstituted benzoic anhydrides of the present invention can be applied to weeds in any of a variety of compositions. Thus any that are sufficiently water soluble can be applied simply in water solution, although as aforementioned, most of these compounds are essentially insoluble in water. Ordinarily, the compounds will be extended with a carrier material or conditioning agent of the kind used and commonly referred to in the art as a herbicidal adjuvant or modifier. Such adjuvants are inert solids, surface-active agents and organic liquids.

Solid formulations can be prepared with inert powders. The formulations thus can be homogeneous powders that either can be used as such, diluted with inert solids to form dusts, or suspended in a suitable liquid medium for spray application. The powders usually comprise active ingredient admixed with a conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder herbicidal compositions can be used. The active ingredient usually makes up from about 5 to 90% of these powder compositions. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, diesel oil and aromatic herbicidal oils, glycols and ketones such as diisobutyl ketone, cyclohexanone, etc. The active ingredient usually makes up from about 0.5 to 50% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents of the liquid or dry compositions cause them to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

The compounds can be applied in compositions of the types shown in Jones U. S. Patent 2,412,510 in which an active compound of the invention replaces the active materials of that patent in the composition shown and in like amounts. Similarly any of the carriers, additives or surface-active agents there named or referred to can be used.

The herbicidal methods of the present invention comprise applying a polysubstituted benzoic anhydride of the aforementioned type, ordinarily in a herbicidal composition such as those described above, to a locus or area to be protected from undesirable plant growth. The active compound is, of course, applied in sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general, when applied as a foliar spray, a dosage of about 2.5 to 100 pounds per acre is used.

In order that the invention can be better understood, the following examples are given in addition to those set forth above:

EXAMPLE 1

In a round bottomed, 3-neck flask, equipped with stirrer, dropping funnel and thermometer are placed 158 parts by weight of dry pyridine and 1000 parts by weight of dry benzene. Then 244 parts by weight of 2,3,6-trichlorobenzoyl chloride is added rapidly through the funnel. The temperature rises slightly and causes separation of a pyridinium complex. While stirring is continued, 2,3,5-trichlorobenzoic acid is added portionwise over a period of five minutes. The temperature rises and causes separation of pyridine hydrochloride, which is filtered off. Removal of the solvent from the filtrate gives a good yield of solid product, 2,3,6-trichlorobenzoic acid, anhydride with 2,3,5-trichlorobenzoic acid. The product may be purified by crystallization from a suitable solvent, but is satisfactory as such for formulation for herbicidal applications.

The thusly obtained solid product is formulated into the following herbicidal composition by blending the ingredients together in a ribbon blender, then micropulverizing until substantially all the particles are below 50 microns in particle diameter:

|  | Percent |
|---|---|
| Active | 80 |
| Polyoxyethylene esters of mixed fatty and resin acids concreted with urea | 3 |
| Synthetic fine silica | 17 |

The thusly prepared composition is then extended with water to give a suspension containing about 1% by weight of the active ingredient. This liquid is then sprayed at a rate of 80 lbs./acre of active ingredient on a field infested with deep-rooted, perennial broadleaf weeds including field bindweed, and also annual broadleaf and grass weeds. Excellent weed control is thereby obtained.

EXAMPLES 2, 3 AND 4

The listed products are prepared in accordance with the procedure of Example 1 using the reactants and the amounts indicated in the following table:

Table I

| Example | Pts. by Weight of substituted Benzoic Acid Used | Pts. by Weight of substituted Benzoyl Chloride Used | Other Reagents | Product Obtained |
|---|---|---|---|---|
| 2 | 2,3,5-trichloro (225.5) | 2,3,5-trichloro (244) | pyridine (158) diethyl ether solvent. | 2,3,5-trichlorobenzoic anhydride. |
| 3 | 2,6-diethyl-3-chloro (184.5) | 2,6-dimethyl-3-chloro (203). | pyridine (158) toluene solvent. | 2,6-dimethyl-3-chloro benzoic anhydride. |
| 4 | 2,3,5,6-tetrachloro (260). | 2,3,5 - trichloroben - zoyl bromide (323). | pyridine (158) benzene solvent. | 2,3,5,6-tetra-chloro benzoic acid anhydride with 2,3,5-trichlorobenzoic acid. |

These products are formulated into herbicidal compositions and used in accordance with the procedure of Example 1 by replacing the active ingredient in the composition of Example 1 with an equal part by weight of these products.

These compositions when used in accordance with the procedure of Example 1 give similar herbicidal results.

EXAMPLE 5

A mixture of 225.5 parts by weight of 2,3,5-trichlorobenzoyl chloride and 400 parts by weight of pyridine is heated on a steam bath for 10 minutes and poured onto a liter of cracked ice. As soon as the ice has melted sufficiently, the mixture is filtered. A high yield of 2,3,5-trichlorobenzoic anhydride is obtained which, when dried, is suitable for formulation.

The following emulsifiable oil is prepared by simple mixing of the three components. It may be diluted with either oil or water before application.

|  | Percent |
|---|---|
| Active | 75 |
| Polyoxyethylene esters of mixed fatty and resin acids | 2 |
| Attapulgite clay | 23 |

This composition is then extended with water to a concentration of 1% by weight of active ingredient. It is then applied (using a pressure sprayer mounted on a tractor) at a rate of 100 lbs./acre of active ingredient, on weed-infested areas along fence rows, giving excellent weed control.

EXAMPLES 6 THROUGH 8

The listed products are prepared in accordance with the procedure of Example 5 using the reactants and the amounts indicated in the following table:

Table II

| Example | Pts. by Weight of substituted Benzoyl Chloride Used | Other reagents | Product Obtained |
|---|---|---|---|
| 6 | 2, 3, 6-trichloro (244) | pyridine (400) | 2, 3, 6-trichloro. |
| 7 | 2, 4-dichloro-6-methyl (223.5) | do | 2, 4-dichloro-6-methylbenzoic anhydride. |
| 8 | 2, 3, 5, 6-tetrachloro (278.5). | do | 2, 3, 5, 6-tetrachlorobenzoic anhydride. |

These products are formulated into herbicidal composition and used in accordance with the procedure of Example 5 by replacing the active ingredient in the composition of Example 5 with an equal part by weight of these products.

EXAMPLE 9

A mixture of 219 parts by weight of 2,3-dimethyl-4,5-dichlorobenzoic acid, 500 parts by weight of acetic anhydride and one gram of orthophosphoric acid is placed in a round bottom flask fitted with a 12-inch glass helices-packed column with reflux head and heated to cause distillation of acetic acid, which is removed from the reaction mixture. This is continued until acetic acid no longer comes off. The pot residue is then heated and placed under a reduced pressure of 25 mm., causing the unreacted acetic anhydride to be removed. The solid residue which remains is essentially pure 2,3-dimethyl-4,5-dichlorobenzoic anhydride.

The following emulsifiable oil containing this product is prepared by simple mixing of the four components. It may be diluted with either oil or water before application.

|  | Percent |
|---|---|
| Active | 50 |
| Methylcellulose | 0.25 |
| Alkyl naphthalene sulfonic acid sodium salt | 1.5 |
| Kaolin china clay | 48.25 |

This composition is extended with water and applied at the rate of 80 lbs./acre of active ingredient in 400 gallons of water to an area infested with a variety of broadleaf weeds, weedy grasses and woody brush and vines. Excellent weed control is obtained with no noticeable hormonal effect on desirable plants growing nearby.

EXAMPLES 10 THROUGH 14

The listed products are prepared in accordance with the procedure of Example 9 using the reactants and the amounts indicated in the following table:

| Example | Pts. by Weight of substituted Benzoic Acid Used | Other Reagents | Product Obtained |
| --- | --- | --- | --- |
| 10 | 3, 5-dichloro-4-methyl (205). | acetic hydride (500). | 3, 5-dichloro-4-methylbenzoic anhydride. |
| 11 | 3, 5-dibromo-4-methyl (294). | anhydride | 3, 5-dibromo-4-methylbenzoic anhydride. |
| 12 | 2-bromo-3, 5-dichloro (270). | acetic anhydride (500). | 2-bromo-3, 5-dichlorobenzoic anhydride. |
| 13 | 2, 3, 5-tribromo (359). | do | 2, 3, 5-tribromobenzoic anhydride. |
| 14 | 2, 4, 6-trichloro-3-methyl (239.5). | do | 2, 4, 6-trichlorobenzoic anhydride. |

These products are formulated into herbicidal compositions and used in accordance with the procedure of Example 9 by replacing the active ingredient in the composition of Example 9 with an equal part by weight of these products.

EXAMPLE 15

In much the same manner as Example 9, 237.5 parts by weight of 2,3-dimethyl-4,5-dichlorobenzoyl chloride and 500 parts by weight of acetic anhydride are heated to distill out acetyl chloride and continued until no more acetyl chloride distills. The solid product is isolated as in Example 9.

| | Percent |
| --- | --- |
| Active | 15 |
| Mixed polyoxyethylene esters of fatty acids and oil-soluble petroleum sulfonates | 5 |
| Diesel oil | 80 |

This composition is then diluted with diesel oil to a concentration 1% by weight of active ingredient. This oil composition is then sprayed at the rate of 60 lbs./acre of active ingredient onto undesirable vegetation growing along the railroad right of way. Excellent weed control is thereby obtained.

EXAMPLES 16 THROUGH 19

The listed products are prepared in accordance with the procedure of Example 15 using the reactants and the amounts indicated in the following table:

| Example | Pts. by Weight of Substituted Benzoyl Chloride Used | Other Reagents | Product Obtained |
| --- | --- | --- | --- |
| 16 | 3, 4, 5-trichloro (244). | acetic anhydride (500). | 3, 4, 5-trichlorobenzoic anhydride. |
| 17 | 2, 6-dimethyl-3, 5-dichloro (237.5). | do | 2, 6-dimethyl-3, 5-dichlorobenzoic anhydride. |
| 18 | 2, 3, 5-triodo (518.5). | do | 2, 3, 5-triodobenzoic anhydride. |
| 19 | 3, 4, 5-triodobenzoyl bromide (563). | do | 3, 4, 5-triodobenzoic anhydride. |

These products are formulated into herbicidal compositions and used in accordance with the procedure of Example 15 by replacing the active ingredient in the composition of Example 15 with an equal part by weight of these products.

EXAMPLE 20

A mixture of 226 parts of 2,3,6-trichlorobenzoic acid and 1500 ml. dry toluene and 54 parts of sodium methylate was heated to distill out methanol produced by the formation of the salt of the acid through an eight-inch Vigreux column. Following the removal of the methanol and about 200 ml. of toluene, the mixture was cooled. To the mixture was added slowly over 20 minutes 244 parts 2,3,6-trichlorobenzoylchloride. The mixture was then refluxed with stirring for 5 hours. An additional liter of dry toluene was added to aid in stirring the heavy slurry which had formed. After allowing the mixture to cool, the mixture was filtered to remove sodium chloride which was produced. The solvent was stripped from the mixture under reduced pressure. The crude solid obtained was suitable for use in oil formulations. However, recrystallization from ethyl acetate gave essentially pure anhydride, M. P. 187–188.5° C.

Analysis.—Calcd. for $C_4H_4Cl_6O_3$: Cl, 49.2. Found: Cl, 48.55.

This product is then formulated into the following herbicidal composition by first blending and micropulverizing the active ingredient and the diatomaceous silica. This mixture is then blended with the major diluent in a ribbon blender to yield a dust suitable for application with a conventional dusting equipment.

| | Percent |
| --- | --- |
| Active | 10 |
| Diatomaceous earth | 20 |
| Micaceous talc | 70 |

This composition is applied at a rate of 800 lbs. of the composition per acre with a fertilizer spreader for the control of broadleaf and annual weeds growing in a lumber yard. This treatment gives effective weed control without the fire hazard attendant the use of oil sprays.

EXAMPLES 21 THROUGH 23

| Example | Pts. by Weight of substituted Benzoic Acid Used | Pts. by Weight of substituted Benzoyl Chloride Used | Other Reagents | Product Obtained |
| --- | --- | --- | --- | --- |
| 21 | 2,3,5-trichloro-(converted to Na salt) (225.5 acid basis). | 2,6-dimethyl-3,5-dichloro (237.5.) | toluene solvent | 2,3,5-trichlorobenzoic acid, anhydride with 2,6-dimethyl-3,5-dichlorobenzoic acid. |
| 22 | 2,3,5-tribromo (converted to K salt) (359 acid basis). | 2,3,5-tribromobenzoyl bromide (422). | dioxane solvent | 2,3,5-tribromobenzoic anhydride. |
| 23 | 1-methyl-2,3,5-trichloro (converted to Na salt) (239 acid basis). | 2,3,5-trichloro (244) | ethylene glycol dimethyl ether solvent. | 1-methyl-2,3,5-trichlorobenzoic acid, anhydride with 2,3,5-trichlorobenzoic acid. |

Each of these products is then formulated into a herbicidal composition of the following ingredients by mixing and micropulverizing the ingredients, moistening the mixture with 10–20% of water and extruding under high pressure to form a pellet composition.

| | Percent |
|---|---|
| Active | 25 |
| Sodium sulfate anhydrous | 10 |
| Kaolin clay | 65 |

These granular compositions are applied at the rate of 400 lbs./acre by hand to control the undesirable weeds and establish a fire break in forests.

I claim:

1. The method for the control of undesirable vegetation comprising applying to the locus to be treated, in an amount sufficient to exert herbicidal action, a compound represented by the formula

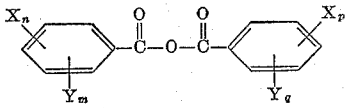

wherein X is halogen; Y is methyl; $n$ and $p$ are 2–4; $m$ and $q$ are 0–2; $n$ plus $m$ equals 3–4 and $p$ plus $q$ equals 3–4.

2. A heribicidal composition comprising a herbicidal adjuvant and, in an amount sufficient to exert herbicidal action, a compound represented by the formula

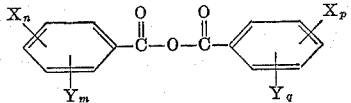

wherein X is halogen; Y is methyl; $n$ and $p$ are 2–4; $m$ and $q$ are 0–2; $n$ plus $m$ equals 3–4 and $p$ plus $q$ equals 3–4.

3. Polysubstituted benzoic anhydrides represented by the formula

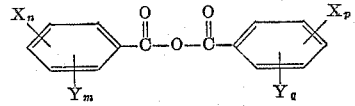

wherein X is halogen; Y is methyl, $n$ and $p$ are 2–4; $m$ and $q$ are 0–2; $n$ plus $m$ equals 3–4 and $p$ plus $q$ equals 3–4.

No references cited.